(12) United States Patent
Ratnapu et al.

(10) Patent No.: US 11,455,637 B2
(45) Date of Patent: Sep. 27, 2022

(54) SYSTEM AND METHOD FOR REPEATABLE AND INTERPRETABLE DIVISIVE ANALYSIS

(71) Applicant: Coupa Software Incorporated, San Mateo, CA (US)

(72) Inventors: Kiran Ratnapu, San Jose, CA (US); Prasanna Kumar, Saratoga, CA (US); Mikin Faldu, San Ramon, CA (US); Fang Chang, Mountain View, CA (US); Maggie M. Joy, Crownsville, MD (US); Arjun Ramaratnam, Fremont, CA (US); Amit Vijayant, San Jose, CA (US)

(73) Assignee: COUPA SOFTWARE INCORPORATED, San Mateo, CA (US)

( * ) Notice: Subject to any disclaimer, the term of this patent is extended or adjusted under 35 U.S.C. 154(b) by 676 days.

(21) Appl. No.: 16/419,438

(22) Filed: May 22, 2019

(65) Prior Publication Data

US 2020/0043006 A1   Feb. 6, 2020

Related U.S. Application Data

(60) Provisional application No. 62/713,499, filed on Aug. 1, 2018.

(51) Int. Cl.
*G06Q 30/02* (2012.01)
*G06Q 20/40* (2012.01)

(52) U.S. Cl.
CPC ..... *G06Q 20/4016* (2013.01); *G06Q 30/0204* (2013.01)

(58) Field of Classification Search
CPC .................................................. G06Q 30/0204
See application file for complete search history.

(56) References Cited

U.S. PATENT DOCUMENTS

2009/0307049 A1*  12/2009  Elliott, Jr. .............. G06Q 40/00
                                                                        705/7.29

OTHER PUBLICATIONS

Mathias Holm, Machine learning and spending patterns: A study on the possibility of identifying riskily spending behavior, KTH, School of Computer Science and Communication (CSC), Jan. 30, 2018. (Year: 2018).*

Kuna et al., Outlier detection in audit logs for application systems, Information Systems 44 (2014) 22-33. (Year: 2014).*

Erin Dienes, I Have An Outlier! CTSPedia, Sep. 7, 2011 (Year: 2011).*

(Continued)

*Primary Examiner* — Nadja N Chong Cruz
(74) *Attorney, Agent, or Firm* — Baker Botts L.L.P.

(57) ABSTRACT

Computer-implemented techniques for repeatable and interpretable divisive analysis. In one embodiment, for example, a method comprises: identifying top-level cohorts of data items based on one or more characteristics of the data items in common; recursively or iteratively dividing a selected top-level cohort in a top-down manner resulting in a plurality of sub-level cohorts arranged in a hierarchy; detecting a particular data item that is a statistical outlier among data items of a leaf cohort in the hierarchy; and causing display of an indication in a computer user interface that the particular data item is an outlier.

9 Claims, 6 Drawing Sheets

(56) References Cited

OTHER PUBLICATIONS

Wikipedia, "K-Means Clustering", https://en.wikipedia.org/wiki/K-means_clustering, last viewed on Aug. 8, 2019, 14 pages.
Wikipedia, "Hierarchical Clustering", https://web.archive.org/web/20180730082225/https://en.wikipedia.org/wiki/Hierarchical_clustering, last viewed on Aug. 8, 2019, 7 pages.

* cited by examiner

SYSTEM AND METHOD FOR REPEATABLE AND INTERPRETABLE DIVISIVE ANALYSIS

CROSS-REFERENCE TO RELATED APPLICATIONS; BENEFIT CLAIM

This application claims the benefit of India Application No. 201941011041, filed Mar. 21, 2019 and U.S. Provisional Application No. 62/713,499, filed Aug. 1, 2018, the entire contents of each of which is hereby incorporated by reference as if fully set forth herein.

TECHNICAL FIELD

The techniques disclosed herein relate generally to computer-implemented techniques for clustering data and identifying outliers among clustered data. More particularly, the computer-implemented techniques disclosed herein relate to a computer system and method for repeatable and interpretable divisive analysis.

BACKGROUND

A very powerful and often used feature of computer systems is the ability to discover natural groupings in data. A general category of techniques for discovering these groupings using a computer system is known as clustering. Clustering is the process of organizing unlabeled data into similarity groups called clusters. A cluster is a collection of data items which are similar between them, and dissimilar to data items in other clusters.

One possible application of clustering is identifying risky spend transactions. The spend transactions may encompass, for example, purchase orders and expenses. The risk may include the risk of fraud or unauthorized spend behavior such as for example an employee submitting an expense reimbursement request for spend on a good or service that the employee did not actually purchase or that is more than the actual monetary expense incurred by the employee in purchasing that good or service. Short of outright fraud, the risk may include less culpable spend behavior such as submitting an expense reimbursement request or a purchase order with incorrect information where there is no intent to deceive.

Conventionally, a centroid-based partitional clustering algorithm such as K-means may be used to identify risky spend transactions. The K-means algorithm may be applied to partition spend transactions into k number of clusters where k is a user-specified parameter. For example, k may be selected based on heuristic estimation of number of likely clusters in total.

In general, conventional K-means algorithms for identifying risky spend transactions operate by starting with randomly selecting k number of spend transactions from the spend data to be the initial centroids of each cluster. Then, each transaction is assigned to the centroid it is closest to after which the k number of centroids are re-computed using the current cluster memberships. This may be repeated until convergence criterion is met (e.g., the sum of the squared error converges to a local minimum.) After the clusters are formed, the risk of a new transaction can be estimated by determining the cluster to which it is closest according to a similarity measure.

K-means is often used for identifying risky spend transactions because it is relatively easy to understand and implement and is relatively efficient in terms of computational time complexity. However, K-means suffers from the drawback that the number k of clusters to form must be predetermined before clustering. This up-front requirement can limit the ability to discover more natural groupings in the transaction data. Further, because the initial centroids are randomly selected, K-means may yield different clustering results on different invocations of the algorithm. As a result, clustering results may not be repeatable or consistent across different invocations and for different sets of spend data. In addition, K-means can be sensitive to outliers in the transaction data, resulting in undesirable clusters.

The techniques described herein address these issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Within a particular organization or industry, a person's spend behavior may be similar to those having the same organizational role and located in the same geographic region for the same category of commodities. For example, entry level software engineers in the high technology industry in the San Francisco Bay Area may expense similar amounts for food and beverage as other entry level software engineers in that industry and area. Likewise, sales managers in the high technology industry in the San Francisco Bay Area may expense similar amounts for food and beverage as other sales managers in that industry and area.

Conversely, spend behavior may differ between people with different organizational roles and in different geographic regions for the same commodity category. For example, the expense spend behavior of sales managers in the San Francisco Bay Area on food and beverage may differ from the expense spend behavior of entry level software engineers in the San Francisco Bay Area on food and beverage, which in turn may be different from the expense spend behavior of entry level software engineers in Pune, India on food and beverage.

In addition to organizational role of the spender and geographic region of the spender, there may be other characteristics of spend transactions that are predictive of similar spend behavior for the same commodity category. The other spend behavior characteristics may include, for example, the calendar season of the spend transaction, the geographic region of the spend transaction, whether the spend transaction was a cash transaction, and whether a receipt for the spend transaction was received by the spender's organization, among other possible spend behavior characteristics. Thus, there may be various spend behavior characteristics of spend transactions that are indicative of similar spend behaviors.

Identifying risk spend transactions based on divisive analysis may begin with identifying spend behavior cohorts of similar spend behavior. The spend data may include data reflecting spend transactions such as, for example, expense lines and/or purchase order lines. Each identified spend behavior cohort may be composed of spend transactions having spend behavior characteristics in common. For example, all of the spend transactions in a spend behavior cohort may have all of the following spend behavior characteristics in common, a subset of these characteristics, or a superset of the subset:

type of spend,
organizational role of the spender,
calendar season for the spend transaction,
commodity category for the spend transaction,
geographic region of the spender,
geographic region of the spend transaction,
method of payment, and
a receipt was/was not received for the spend transaction.

Even though all the spend transactions in an identified spend behavior cohort may possess spend behavior characteristics in common, there may still be different patterns of spend behavior among the spend transactions in the cohort. The different patterns of spend behavior may result from difficult to ascertain, unpredictable or dynamic spend behavior characteristics.

For example, there may be spend behavior variance even among expenses submitted by sales managers in the San Francisco Bay Area for food and beverage during a particular sales quarter. For example, it may be the case that two different spend behavior patterns are present because one set of sales managers happened to be soliciting chief executive officers during the sales cycle (causing relatively higher expenses for food and beverage) while another set of sales managers were soliciting information technology managers during that cycle (resulting in relatively lower expenses for food and beverage.) Thus, while similar spend behaviors can be identified based on readily ascertainable spend behavior characteristics of spend transactions, there may nevertheless still be various different spend behaviors among the spend transactions.

One possible way to detect a risky spend transaction is to determine if the transaction is a statistical outlier among all spend transactions in an identified spend behavior cohort. For example, a spend transaction having a spend amount that is more than three deviations from the mean of all spend transactions in the spend behavior cohort may be identified as risky. However, as mentioned in the Background section above, there may be different patterns of spend behavior even within a seemingly similar spend behavior cohort. As such, detection of an outlier may be due to the non-normality of the distribution of the spend transactions in the cohort, rather than the presence of a true outlier.

The divisive analysis techniques disclosed herein may be implemented to uncover "latent" patterns of different spend behaviors among a spend behavior cohort of spend transactions that share spend behavior characteristics in common. Outlier detection may then be performed with respect to the discovered patterns within the cohort. Two particular embodiments of the divisive analysis are discussed more below. Generally, the divisive analysis techniques may include constructing a hierarchy of spend behavior cohorts starting with a single spend behavior cohort of spend transactions that share readily ascertainable, spend behavior characteristics in common.

Summary of First Embodiment

According to the first embodiment of the divisive analysis techniques, a cohort of spend transactions all having a same type of spend is recursively divided into sub-cohorts according to a predefined set of categorical attributes of the spend transactions. At each division, an original cohort is divided into two sub-cohorts according to a selected categorical attribute value that minimizes spend amount variance/maximizes spend amount homogeneity of the two sub-cohorts. The selected categorical attribute value may be selected from among all values of all remaining attributes of the predefined set of categorical attributes that have not already been selected to divide a cohort.

When the original cohort is divided into the two sub-cohorts, one of the two sub-cohorts contains spend transactions of the original cohort that all have the selected categorical attribute value. The other sub-cohort contains the remaining spend transactions of the original cohort that do not have the selected categorical attribute value.

The categorical attribute value selected to divide the original cohort is selected based on its ability to predict spend amounts as measured by the extent to which dividing the original cohort by the selected categorical attribute value into the two sub-cohorts minimizes spend amount variance/maximizes the spend amount homogeneity of the two sub-cohorts compared the spend amount variance/spend amount homogeneity of the original undivided cohort. Cohorts may be recursively divided this way so long as the spend amount variance can be reduced/spend amount homogeneity can be increased, or until all of the predefined categorical attributes have been selected to divide a cohort. The result of the recursive dividing is a hierarchy/tree of spend behavior cohorts. The leaf cohorts each contain spend transactions of the original cohort with minimized spend amount variance/maximum spend amount homogeneity according to the predefined set of attributes. Outlier detection may then be performed on each of the leaf cohorts to identify risky spend transactions.

Summary of Second Embodiment

According to the second embodiment of the divisive analysis techniques, cohorts are recursively divided as long as each cohort contains at least a statistically significant number of spend transactions for outlier detection. At each division stage, the cohort with the largest spend diameter may be selected for division. The spend diameter of a cohort may be calculated as the largest spend difference between any two spend transactions in the cohort. The spend distance between two spend transactions may be measured by the Euclidean distance or the Manhattan distance, for example. The cohort selected for division may be divided by identifying the most disparate spend transaction in the cohort. The most disparate spend transaction may be one with the largest average spend distance with the other spend transactions in the cohort. This most disparate spend transaction may initiate a new "breakaway" cohort that contains the most disparate spend transaction. Thereafter, it may be determined if each spend transaction remaining in the "non-breakaway" cohort is closer in average spend distance to the other spend transactions in the non-breakaway cohort or to the spend transactions in the breakaway cohort. The spend transaction in the non-breakaway cohort that is closest to the breakaway cohort may be moved from the non-breakaway cohort to the breakaway cohort. This may be repeated until there are no remaining spend transactions in the non-breakaway cohort that are closer on average to the breakaway cohort than to non-breakaway cohort. After this, the breakaway cohort and the non-breakaway cohort may be added to the hierarchy as children of the current cohort being divided. As mentioned above, the division may then proceed with the breakaway cohort or the non-breakaway cohort depending on which of those cohorts has the largest spend diameter and so long as both cohorts have at least the statistically significant number of spend transactions for outlier detection. As a result of the divisive analysis, a hierarchy of spend behavior cohorts may be produced. Each cohort in the hierarchy may contain spend transactions from the original spend behavior cohort. Outlier detection may be performed on the leaf cohorts in the hierarchy to identify risky spend transactions.

In either the first embodiment or the second embodiment above, a spend transaction in a leaf cohort having a spend amount that is three or more deviations above the mean spend amount for all spend transactions in the cohort may be identified as risky. An indication that the spend transaction has been identified as risky may be provided in a user interface (e.g., in a graphical user interface or in a command terminal window.) For example, the divisive analysis of the first or second embodiment may be performed on expense reports waiting approval so that any expense lines in the reports identified as risky may be flagged in a user interface for the approver. As another example, the divisive analysis of the first or second embodiment may be performed as part of an audit to identify risky expense reports post-approval or risky purchase order post submission.

Technical Effects of the First and Second Embodiment

The divisive analysis techniques disclosed herein provide many technical benefits over conventional approaches for identifying risky spend transactions, including the benefit of having complete information about the original spend behavior cohort when making top-level dividing decisions. Because of the top-down nature of the divisive analysis, the result of the divisive analysis may be more accurate leaf cohorts in the resulting hierarchy that better reflect the actual different varying spend behaviors of the original cohort.

Another benefit of the divisive analysis techniques disclosed herein is repeatability. Without repeatability, a spend risk detection algorithm can only be used for initial exploration but cannot be operationalized for certain investigative applications such as, for example, employee risk. Investigators relying on the predictions from an algorithm in constructing a risk case against an employee will require repeatability of the evidence assembled. The first and second embodiments disclosed herein provide such repeatability.

Yet another benefit of the first and second embodiments is interpretability. Because of the deterministic nature of the divisions in the first and second embodiments, the leaf cohorts, which are used to determine the outliers, have explainable characteristics and so too the outliers that are determined as a result. For example, a leaf cohort might have spend transactions all with the same following categorical attributes and associated values: employee city is "New York," employee level is "entry level," and employee function is "sales." As a result, the mean of this leaf cohort reflects the normal spending of entry level sales employees in New York. An outlier employee belonging to this leaf cohort can be readily explained as spending significantly above the norm than his peers. This interpretability along with repeatability of outliers is important to auditors when auditing employees. Unlike applications like credit card fraud detection, where a risk of wrong prediction will only result in temporary blocking of card, employee fraud investigators cannot proceed without understanding the full context of why an employee is deemed risky which makes interpretability and repeatability a useful factor of the disclosed techniques.

While the divisive analysis techniques disclosed herein may be used in lieu of conventional approaches for identifying risky spend transactions such as a conventional k-means-based approach, the divisive analysis techniques disclosed herein may be used in conjunction with one or more other approaches. For example, a k-means-based approach may be used to identify the original spend behavior cohorts to which a divisive analysis technique disclosed herein is then applied.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Hardware Implementing Mechanism

Figure 1:
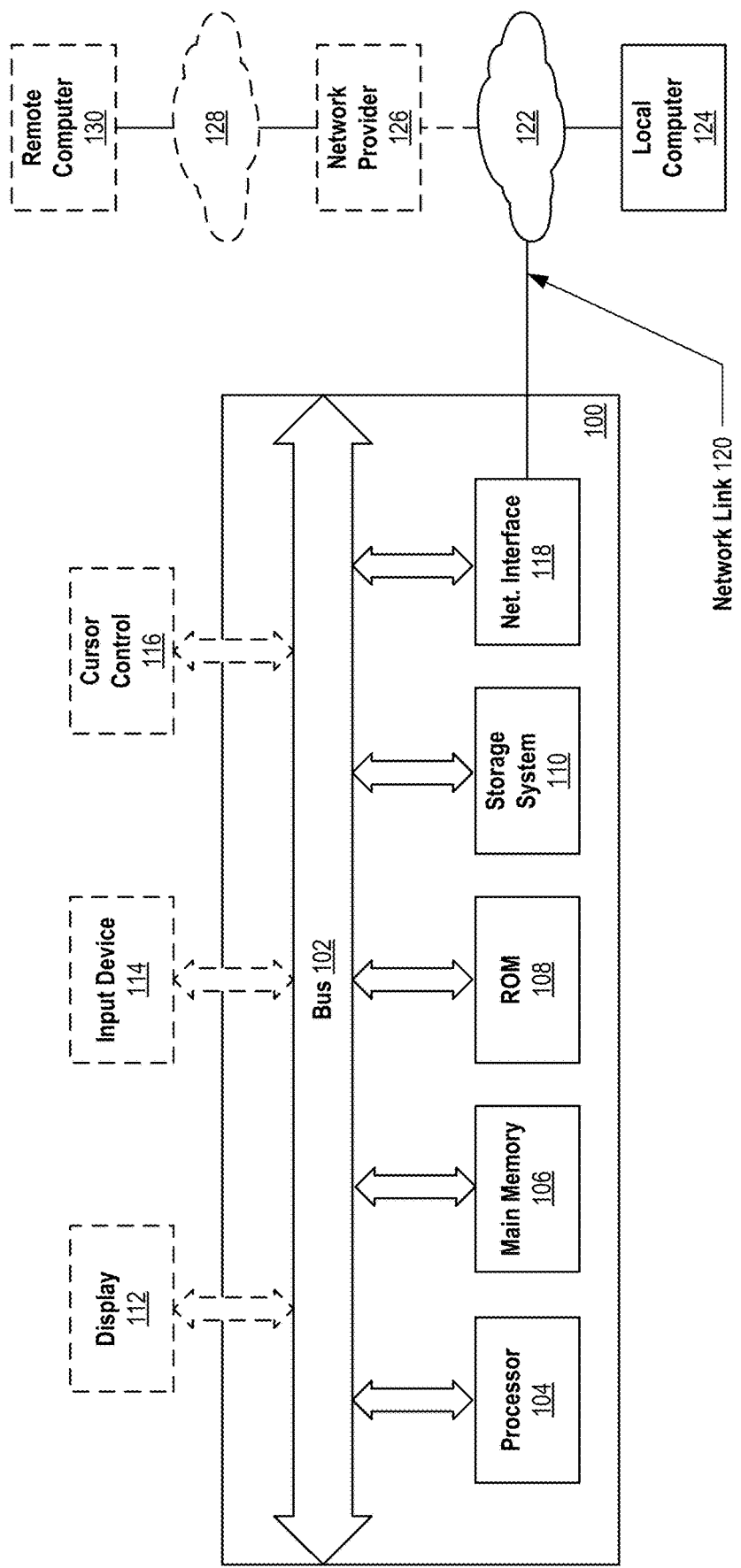
FIG. 1 depicts an example computer system that may be used in an implementation of identifying risk spend transactions based on divisive analysis, according to some embodiments.

FIG. 1 is a block diagram of an example computer system 100 that may be used in an implementation of spend risk identification based on divisive analysis. The implementation may encompass performance of a method or process. The method or process may be performed by a computing system having one or more processors and storage media. The one or more processors and storage media may be provided by one or more computer systems 100. The storage media of the computing system may store one or more computer programs. The one or more computer programs may include instructions configured to perform the method or process.

In addition, or alternatively, an implementation may encompass instructions of one or more computer programs. The one or more computer programs may be stored on one or more non-transitory computer-readable media. The one or more stored computer programs may include instructions. The instructions may be configured for execution by a computing system having one or more processors. The one or more processors of the computing system may be provided by one or more computer systems 100. The computing system may or may not provide the one or more non-transitory computer-readable media storing the one or more computer programs.

In addition, or alternatively, an implementation may encompass instructions of one or more computer programs.

The one or more computer programs may be stored on storage media of a computing system. The one or more computer programs may include instructions. The instructions may be configured for execution by one or more processors of the computing system. The one or more processors and storage media of the computing system may be provided by one or more computer systems 100.

If an implementation encompasses multiple computer systems 100, the computer systems 100 may be arranged in a distributed, parallel, clustered or other suitable multi-node computing configuration in which computer systems 100 are continuously, periodically or intermittently interconnected by one or more data communications networks (e.g., one or more internet protocol (IP) networks.)

Example computer system 100 and its hardware components is described in greater detail below.

Top-Level Spend Behavior Cohort

Before performance of process 200 (FIG. 2) or process 400 (FIG. 3) described below, a spend behavior cohort identification system may identify one or more top-level spend behavior cohorts. Each top-level spend behavior cohort may include one or more spend transactions. Process 200 or process 400 may be performed on each of the identified top-level spend behavior cohorts.

All of the spend transactions in a top-level spend behavior cohort may share spend behavior characteristics in common. Two spend transactions may have a spend behavior characteristic in common if they share the exact same spend behavior characteristic (e.g., exact data value match) or share a similar spend behavior characteristic according to a similarity measure (e.g., according to a text, semantic or clustering similarity measure.) For example, according to the requirements of the particular implementation at hand, the cohort identification system may determine that two spend transactions have the organization role of the spender in common where the organizational role of the spender of one of the spend transactions is "manager" and the organizational role of the spender of the other of the spend transactions is "supervisor." In other implementations, according to the requirements of the particular implementation at hand, the cohort identification system may determine that these two spend transactions do not have the organization role of the spender in common. Thus, where data values representing spend behavior characteristics do not match exactly, different implementations may use different similarity criteria and measures to determine whether the data values represent spend behavior characteristics that spend transactions have in common.

The spend behavior cohort identification system can identify top-level spend behavior cohorts in a variety of different ways. In one way, the cohort identification system identifies spend transactions that have a predefined set of spend behavior characteristics in common. The spend behavior cohort identification system may identify the spend transactions from among spend data. The spend data may be collected for a particular business or organization or a particular set of businesses or organizations. For example, the spend data may be aggregated or stored in a data warehouse database system and the spend behavior cohort identification system may identify top-level spend behavior cohorts by executing queries against the database system. The spend data may include submitted or approved expense reimbursement requests and/or submitted or approved purchase orders, for example. The spend transactions may corresponding to expense lines and purchase order lines from the expense requests and the purchase orders, for example.

The spend data for spend transactions may contain a variety of different data values representing different spend behavior characteristics of the spend transactions. The spend behavior cohort identification system may identify spend transactions having spend behavior characteristics in common based on these data values. As mentioned, the spend transactions in a top-level spend behavior cohort may have all of the following spend behavior characteristics in common, a subset of these characteristics, or a superset of the subset:

type of spend,
organizational role of the spender,
organizational level of the spender,
organizational function of the spender,
organizational title of the spender,
organizational department of the spender,
organizational division of the spender,
calendar season for the spend transaction,
commodity category for the spend transaction,
geographic region of the spender,
geographic region of the spend transaction,
method of payment, and
a receipt was/was not received for the spend transaction.

The data values representing spend behavior characteristics of spend transactions may be normalized before the spend behavior cohort identification system uses the normalized data values to identify top-level spend behavior cohorts. For example, the spender organizational level may be normalized to an integer value between 1 and 7 inclusive representing seven different hierarchical levels within a business or organization. The organizational role, function, title, department, and division of the spender may be normalized to a respective set of predefined values. The calendar season for the spend transaction may be normalized by calendar month (e.g., January, February, March, etc.) or calendar quarter (e.g., Q1, Q2, etc.) The commodity category for the spend transaction may be normalized according to a standard hierarchical taxonomy of commodities such as for example, the United Nations Standard Products and Services Code (UNSPSC), the Common Procurement Vocabulary (CPV), GS1 Global Product Classification (GPC), or eCl@ss. For example, commodity category for the spend transaction may be a family, class and/or commodity code from the UNSPSC for the commodity that is the subject of the spend transaction. Geographic region of the spender and geographic region of the spend transaction may be normalized to city, state, country and/or predefined world region.

Machine or deep learning may be used to normalize some of the data values. For example, such techniques may be used because of the complexity and variability in text descriptions of commodities of spend transactions. For example, a trained deep learning classifier may be used to classify the text description of a commodity that is the subject of a spend transaction into a standard commodity category (e.g., a family code of the UNSPSC). The trained deep learning classifier may do this even if the classifier has never "seen" the text description previously. For example, the trained classifier may infer that a spend transaction having a text description of a commodity such as for example "plastic, 500 ml, Crystal Geyser" should be classified with a standard commodity category for "bottled water." Because of the highly accurate classifications by the trained classifier, more accurate automatic spend risk identification may be possible. Without using a trained deep learning classifier to classify spend transaction in standard spend categories, different spend transaction including never before seen spend transactions may be incorrectly classified into different spend categories even though they belong to the same spend category, which may reduce the effectiveness of the automatic spend risk identification because two spend transactions that should be identified by the cohort identification system as belonging to the same top-level spend behavior cohort may instead be identified as belonging to two different top-level spend behavior cohorts.

Once trained, the deep learning classifier may classify spend transactions in a set of standard spend categories where each standard spend category represents a standard category of spend (e.g., "furniture and furnishings," "software," "telecom services," "office equipment," etc.) according to a standard taxonomy of commodities. For example, as mentioned, the set of standard spend categories may be from the United Nations Standard Products and Services Code (UNSPSC), the Common Procurement Vocabulary (CPV), the GS1 Global Product Classification (GPC), or the set of eCl@ss code.

The standard taxonomy of commodities may be hierarchical. For example, the foregoing standard taxonomy systems each have four hierarchical classification levels from more general to more specific respectively and named as follows:

TABLE 1

| Standard Taxonomy System | Hierarchical Levels |
| --- | --- |
| UNSPSC | Level 1 (most general) Segment |
|  | Level 2 Family |
|  | Level 3 Class |
|  | Level 4 (most specific) Commodity |
| CPV | Level 1 (most general) Divisions |
|  | Level 2 Groups |
|  | Level 3 Classes |
|  | Level (most specific) Categories |
| GPC | Level 1 (most general) Segment |
|  | Level 2 Family |
|  | Level 3 Class |
|  | Level 4 (most specific) Brick |
| eCl@ss | Level 1 (most general) Segments |
|  | Level 2 Main Groups |
|  | Level 3 Groups |
|  | Level 4 (most specific) Commodity Classes |

Spend transactions may be classified by the trained deep learning classifier into a particular hierarchical level of a standard taxonomy system. The particular hierarchical level may be one that is above the individual commodity level so as to provide a high-level categorization of individual commodities. For example, the particular hierarchical level may be family level of the UNSPCS, the groups level of the CPV, the family level of the GPC, or the main groups level of the eCl@ss. However, it is also possible to classify spend data lines at other levels (e.g., at the segment, family, class and commodity level of the UNSPSC) or at all levels from the most general level to the most specific level.

As an example, a spend transaction from an expense request or purchase order may have a text description of a commodity such as for example "Ball End Hex Key Set Measurement Type SAEMetric Handle Type L-Shaped Arm Type Long Blade Material Chrome Vanadium Steel Fish Chrome Plated Number of Pieces 22 Arm Length 2.80 to 8.80 in. Sizes included 0.050 116 564 332 764 18 964 532 316 732 14 516 38." After extracting nouns verbs and adjectives from the text description, those features may be classified together by the trained deep learning classifier in the following UNSPSC hierarchy levels:

TABLE 2

| UNSPSC Hierarchy Level | Standard Spend Category |
| --- | --- |
| Commodity | "Hex keys" |
| Class | "Wrenches and drivers" |
| Family | "Hand tools" |
| Segment | "Tools and general machinery" |

In a similar way, all spend transactions of a set of spend data may be classified by a trained deep learning classifier in standard spend categories.

First Embodiment

According to a first embodiment of the divisive analysis techniques for identifying risky spend transactions, a cohort of spend transactions with one or more characteristics in common is recursively divided into sub-cohorts according to a predefined set of categorical attributes of the spend transactions. At each division, an original cohort is divided into two sub-cohorts according to a selected categorical attribute value that minimizes spend amount variance/maximizes spend amount homogeneity of the two sub-cohorts among all remaining categorical attribute values of the predefined set of categorical attribute values. The selected categorical attribute value may be selected from among all values of all remaining attributes of the predefined set of categorical attributes that have not already been selected to divide a cohort.

When the original cohort is divided into the two sub-cohorts, one of the two sub-cohorts contains spend transactions of the original cohort that all have the selected categorical attribute value. The other sub-cohort contains the remaining spend transactions of the original cohort that do not have the selected categorical attribute value. The categorical attribute value selected to divide the original cohort is selected based on its ability to predict spend amounts as measured by the extent to which dividing the original cohort by the selected categorical attribute value into the two sub-cohorts minimizes the spend amount variance/increases spend amount homogeneity of the two sub-cohorts compared the spend amount variance/spend amount homogeneity of the original undivided cohort.

Cohorts are recursively divided this way so long as the spend amount variance can be reduce/spend amount homogeneity can be increased, or until all of the predefined categorical attributes have been selected to divide a cohort. Division of a cohort may also stop if it contains less than a statistically significant number of spend transactions suitable for outlier detection. For example, a cohort may not be divided if it contains less than one-hundred (100) spend transactions.

The result of the recursive dividing is a binary tree of spend behavior cohorts. The leaf cohorts each contain spend transactions with minimized spend amount variance/maximum spend amount homogeneity according to the predefined set of attributes. Outlier detection may then be performed on each of the leaf cohorts to identify risky spend transactions.

Figure 2:
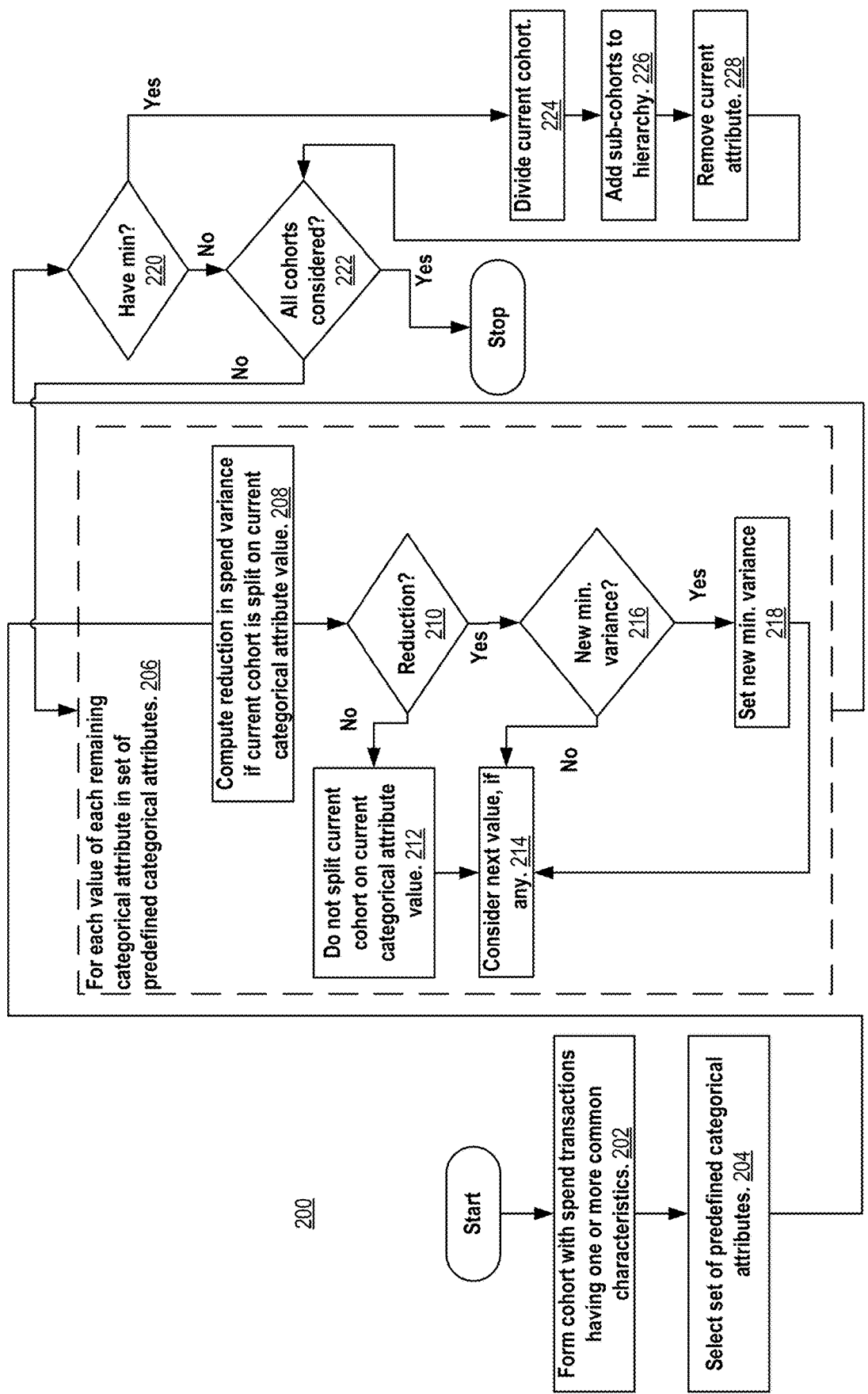
FIG. 2 depicts a process for identifying risky spend transactions based on divisive analysis according to the first embodiment.

FIG. 2 depicts an example process 200 for identifying risky spend transactions based on divisive analysis, according to the first embodiment. Before performance of process 200, a spend behavior cohort identification system may identify one or more top-level spend behavior cohorts containing spend transactions.

Once the spend behavior cohort identification system has identified one or more top-level spend behavior cohorts, a divisive analysis system may perform process 200 on a selected top-level spend behavior cohort. For example, the selected top-level spend behavior cohort may contain hundreds or thousands of spend transactions having spend behavior characteristics in common for a particular business, organization, or other entity, or a particular set of businesses (e.g., a set of business all in the same industry.) The spend transactions may span a particular period of time such as for example the past month, past quarter or past year or other period of time.

In general, the process 200 may recursively (or iteratively) divide the selected top-level spend behavior cohort in a top-down manner. The top-down manner may result in transforming the single selected top-level spend behavior cohort into a hierarchy/binary tree of spend behavior cohorts that has the selected top-level spend behavior cohort at the root of the hierarchy/binary tree and a plurality of sub-level spend behavior cohorts as direct or indirect descendants of the root within the hierarchy/binary tree. Each of the sub-level spend behavior cohorts may include a strict subset of the spend transactions contained its parent cohort in the binary tree.

Process 200 may commence by forming 202 a spend behavior cohort with spend transactions that share one or more characteristics in common. For example, the spend behavior cohort can be a selected top-level spend behavior cohort. In some implementations, the spend behavior cohort is formed 202 by selecting, for inclusion in the spend behavior cohort, spend transactions that at least all have the same type of spend. The spend type may reflect the type of spend to which the transactions are directed. This is done to account for expected normal spend amount variance between different types of spend. For example, the spend behavior cohort formed 202 may include all expense report transactions for food and beverage for group business dinners during a particular period of time for a particular company. However, the spend behavior cohort formed 202 is not limited to only spend transactions sharing certain particular characteristics. In general, the one or more characteristics in common, of the spend transactions selected for inclusion in the spend behavior cohort formed 202, may be those that account for some of the expected normal spend amount variance but not necessarily all of the expected normal spend amount variance.

At step 204, a set of predefined categorical attributes for the divisive analysis is selected. The set of predefined categorical attributes may be selected based on available attributes of the spend transactions of the spend behavior cohort formed 202 that might be expected to account for normal spend amount variance within the spend transactions. In some implementations, the set of predefined categorical attributes selected include all of the following attributes, or a subset of these attributes, or a superset of the subset:

type of spend (e.g., lunch, breakfast, dinner, team dinner, airfare, gas, hotel, etc.),
organizational role of the spender,
organizational level of the spender,
organizational function of the spender,
organizational title of the spender,
organizational department of the spender,
organizational division of the spender,
calendar season for the spend transaction,
commodity category for the spend transaction,
geographic region of the spender,
geographic region of the spend transaction,
method of payment, and
a receipt was/was not received for the spend transaction.

Each of the above-example categorical attributes of the spend transactions may have one or more possible values in the spend data. For example, the possible values for organizational level of the spender may include "entry level," "mid-level," "manager," and "executive." The set of possible values for a given categorical attribute may vary from categorical attribute to categorical attribute and from spend dataset to spend dataset. For example, the set of possible values for organizational level of the spender in Company A's spend dataset may be different from the set of possible values in Company B's spend data due to differences in how Company A and Company B classify employee levels. Table 3 below lists some example possible values for each of the above-example categorical attributes. However, it should be understood that the first embodiment is not limited to any particular set of categorical attributes or any particular set of possible values for a particular categorical attribute.

TABLE 3

| Categorical Attribute | Example Possible Values |
| --- | --- |
| Type of spend. | "lunch," "breakfast," "dinner," "team dinner," "airfare," "gas," "hotel," etc. |
| Organizational role of the spender. | "Engineer," "sales," "CEO," etc. |
| Organizational level of the spender. | "Entry level," "mid-level," "manager," "director," "vice president," "president," etc. |
| Organizational function of the spender. | "Staff," "line," etc. |
| Organizational title of the spender. | "Controller," "HR coordinator," "certified financial planner," "business systems analyst," "web developer," "actuary," "residential appraiser," etc. |
| Organizational department of the spender. | "Accounting," "engineering," "sales," "human resources," etc. |
| Organizational division of the spender. | "Electronics," medical Equipment," "computer software," "consulting," etc. |
| Calendar season for the spend transaction. | "Winter," "spring," "summer," or "fall." |
| Commodity category for the spend transaction. | <A standard commodity category code of the UNSPSC, CPV, GPC, eCl@ss, or the like.> |

TABLE 3-continued

| Categorical Attribute | Example Possible Values |
| --- | --- |
| Geographic region where the spender lives or works. | "Africa," "Asia," "Central America," "Eastern Europe," "European Union," "Middle East," "North America," "Oceania," "South America," "The Caribbean," etc. |
| Geographic region where the spend transaction was conducted. | <See Geographic region where the spender lives or works above.> |
| City where the spender lives or works. | "New York," "San Francisco," "Pune," "London," etc. |
| State where the spender lives or works. | "New York," "California," etc. |
| Country where the spender lives or works. | "USA," "India," "China," "Germany," etc. |
| City where the spend transaction was conducted. | <See City of the spender above.> |
| State where the spend transaction was conducted. | <See State of the spender above.> |
| Country where the spend transaction was conducted. | <See Country of the spender above.> |
| A receipt was/was not received for the spend transaction. | <A binary value.> |

While example possible values of categorical attributes are provided above as string data types, possible values can be represented by other data types including integers, enumerations, byte arrays, etc.

Initially, the current spend behavior cohort under consideration for division is the spend behavior cohort formed 202. Generally, process 200 may divide the current spend behavior cohort if dividing the current spend behavior cohort into two sub-cohorts would reduce the spend variance/increase the spend homogeneity of the spend transactions in the current spend behavior cohort when divided over the two sub-cohorts. If the current spend behavior cohort is divided into two sub-cohorts, then each of the two sub-cohorts are added as child cohorts of the current spend behavior cohort in a hierarchy/binary tree of cohorts constructed from the divisive analysis process 200. Also, the selected categorical attribute (and all of its possible values) that was used to divide the current spend behavior cohort is removed from the selected set of categorical attributes 204 for further consideration during the divisive analysis process 200. Then, each of the child cohorts is taken as the current spend behavior cohort and considered for further division. The division continues this way recursively (or iteratively) while categorical attributes remain for dividing on and so long as there is at least one spend behavior cohort in the hierarchy/binary tree that contains a statistically significant threshold number of spend transactions (e.g., 100) and, if divided, would reduce the spend variance/increase the spend homogeneity of the spend transactions in the spend behavior cohort. When division stops, outlier detection may be performed on the spend transactions in the leaf spend behavior cohorts of the hierarchy constructed to identify risky spend transactions.

When considering to divide the current spend behavior cohort, all possible values of all remaining categorical attributes are evaluated 206 to determine which remaining categorical attribute value, if any, minimizes the spend variance when the current spend behavior cohort is divided on that categorical attribute value. To do this, the spend variance, if the current spend behavior cohort were to be divided, is computed 208 for each possible value of each remaining categorical attribute. The remaining categorical attribute value that minimizes the spend variance, if any, is then selected to divide the current spend behavior cohort.

For example, if one of the remaining categorical attributes is organization role of the spender and the possible values for this attribute include "engineer," "sales," and "CEO," then computation 208 would be performed for the current cohort for each of these possible values.

Figure 3:
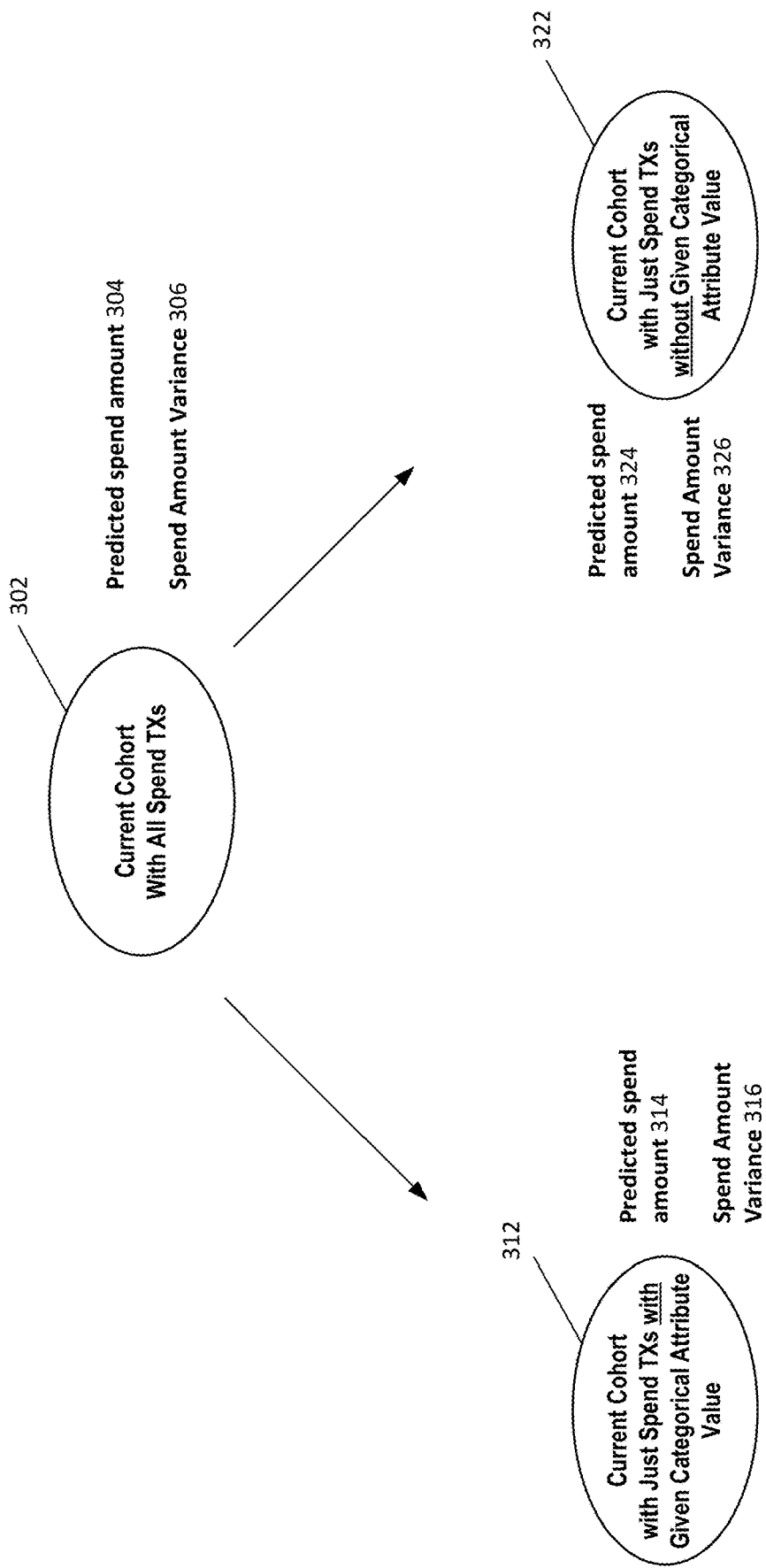
FIG. 3 depicts computing the minimal spend variance for a current spend behavior cohort under consideration for dividing by a current categorical attribute value, according to the first embodiment.

FIG. 3 depicts the computation 208 for the current spend behavior cohort and a current categorical attribute value. In the reduction computation 208, three different groups 302, 312, and 322 of spend transactions are considered: all spend transactions of the current spend behavior cohort 302, all spend transactions of the current spend behavior cohort that have the given categorical attribute value 312, and all other spend transactions of the current spend behavior cohort that do not have the given categorical attribute value 322. For ease of explanation, these are referred to as the all spend transactions group 302, the positive spend transactions group 312 (because the spend transactions in this group are those spend transactions of group 302 that have the given categorical attribute value), and the negative spend transactions group 322 (because the spend transactions in this group are those spend transactions of group 302 that do not have the given categorical attribute value).

For each of groups 302, 312, and 322, a respective predicted spend amount is computed. The respective predicted spend amount may be computed as the average (mean) of all spend amounts of all spend transactions in the respective group. For example, predicted spend amount 304 may be computed as the average (mean) of all spend amounts of all spend transactions in group 302, predicted spend amount 314 may be computed as the average (mean) of all spend amounts of all spend transactions in group 312, and predicted spend amount 324 may be computed as the average (mean) of all spend amounts of all spend transactions in group 322.

Also, for each of groups 302, 312, and 322, a respective spend amount variance may be computed. The respective spend amount variance may be computed by summing Euclidean distances between spend amounts in the group and the respective predicted spend amount for the group. The Euclidean distance can be based on the L2 norm or the L1 norm, for example. For example, spend amount variance 306 may be computed as the sum of all Euclidian distances of all spend amounts of the spend transactions in group 302 from predicted spend amount 304, spend amount variance 316 may be computed as the sum of all Euclidian distances of all spend amounts of the spend transactions in group 312 from predicted spend amount 314, and spend amount variance 326 may be computed as the sum of all Euclidian distances of all spend amounts of the spend transactions in group 322 from predicted spend amount 324.

It should be noted that while computation 208 may be performed serially for the current spend behavior cohort, one computation 208 for each remaining categorical attribute value, it is also possible to parallelize computation 208 such that computation 208 is performed concurrently for a plurality of remaining categorical attribute values at a time.

Returning now to FIG. 2, the spend variance of the current spend behavior cohort is compared 210 against the spend variance of the current spend behavior cohort if it were to be divided on the current categorical attribute value. If the sum of the spend variances of the two sub-cohorts (e.g., spend variance 316+spend variance 326) is less than the spend variance of the current spend behavior cohort as a whole (e.g., 306), then there is a reduction in the spend variance if the current spend behavior cohort were to be divided on the current categorical attribute value. Otherwise, the spend variance is not reduced. If the spend variance is reduced, it is sometimes referred to hereinafter as the reduced spend variance.

As mentioned, it may be the case that there is no reduction 210 in spend variance if the current spend behavior cohort were to be divided based on the current categorical attribute value. In that case 212, the current spend behavior cohort is not divided on the current categorical attribute value and the next remaining categorical attribute value, if any, is considered 214 for dividing the current spend behavior cohort. However, if there is a reduction 210 in spend variance if the current spend behavior cohort is divided based on the current categorical attribute value, then the reduced spend variance for the current categorical attribute value is compared 216 against the minimum spend reduced variance computed so far for the current spend behavior cohort among all categorical attribute values already considered for dividing the current spend behavior cohort. If the current reduced spend variance is less than the minimum spend variance computed so far, then the current spend variance becomes the new minimum spend variance for the current spend behavior cohort. Otherwise, the next remaining categorical attribute value, if any, is considered 214 for dividing the current cohort. It is also possible to compute the spend variance for all of the remaining categorical attribute values and then thereafter select the categorical attribute value that minimizes the spend variance among all of the remaining categorical attribute values, instead of comparing against a minimum spend variance computed so far after each spend variance computation.

After all remaining categorical attribute values have been considered for dividing the current spend behavior cohort, then if 220 a particular categorical attribute value provided a minimum spend variance, then the current spend behavior cohort is divided 224 into two sub-cohorts based on that particular categorical attribute value as being the categorical attribute value of the remaining categorical attribute values that is most predictive of the spend amounts of the current spend behavior cohort. One of the two sub-cohorts contains all of the spend transactions of the current spend behavior cohort that have the particular categorical attribute value and the other of the two sub-cohorts contains all of the remaining spend transactions of the current spend behavior cohort that do not have the particular categorical attribute value. The two sub-cohorts are added 226 to the hierarchy/binary tree of cohorts as direct child cohorts of the current spend behavior cohort. And since the particular categorical attribute has been used to divide a cohort, it is removed 228 from the set of remaining categorical attributes. Process 200 then proceeds to consider each remaining 222 cohort in the hierarchy (including each of the two just added 226) for dividing.

If 220, on the other hand, there is no remaining categorical attribute value providing a reduction in spend variance for the current spend behavior cohort, then the current cohort is not divided and each remaining 222 cohort in the hierarchy, if any, is considered as the current spend behavior cohort for dividing. Process 200 stops after all cohorts in the hierarchy have been considered for dividing.

While in some embodiments the current spend behavior cohort is not divided if there is no remaining categorical attribute value providing a reduction in spend variance for the current spend behavior cohort, the current spend behavior cohort is divided if there is a remaining categorical attribute value that does not increase the spend variance even though the remaining categorical attribute value does not reduce the spend variance. For example, if the sum of the spend variances of the two sub-cohorts (e.g., spend variance 316+spend variance 326) for a particular categorical attribute value is equal to the spend variance of the current spend behavior cohort as a whole (e.g., 306) for the particular categorical attribute value, then the current spend behavior cohort may be divided on the particular categorical attribute value even though there is no reduction in the spend variance by dividing.

Process 200, including the individual operations thereof, may run in single or multiple instances, and run in parallel, in conjunction, together, or one process 200 or individual operation may be a sub-process or sub-operation of another process 200 or individual operation. Further, any of the processes discussed herein, including process 200 may run on the systems and hardware discussed herein, including those depicted in FIG. 1 and FIG. 5.

After the divisive analysis system has applied process 200 to a selected top-level spend behavior cohort, a spend risk identification system may conduct outlier analysis on the leaf cohorts of the hierarchy produced as a result of the divisive analysis. Here, a leaf cohort is a sub-level spend behavior cohort of the hierarchy produced that does not have any descendant sub-level spend behavior cohorts in the hierarchy. The outlier analysis may be conducted in various ways according to outlier detection criteria.

According to example one outlier detection criteria, a spend transaction is considered to be risky if the spend amount of the spend transaction is greater than three deviations from the mean of all spend transactions in the leaf cohort.

According to another example outlier detection criteria, a spend transaction is considered to be risky if the spend amount of the spend transaction is above the third quartile of all spend amounts of all spend transactions in the leaf cohort plus 1.5 times (inner) or 3 times (outer) the interquartile range of all spend amounts of all spend transactions in the leaf cohort (i.e., above the upper inner or upper outer Tukey fence.) Other outlier detection criteria may be used including combinations (e.g., weighted) of different outlier detection criteria according to the requirements of the particular implementation at hand.

It some embodiments, just-in-time or real-time outlier detection is performed on spend transactions that were not part of the originally formed 202 spend behavior cohort. For example, consider an employee that submits an expense report after process 200 is performed on a selected top-level spend behavior cohort. The spend attributes of the spend transactions of the expense report can be used to identify the leaf cohorts to which the spend transactions of the expense report belong. Then outlier detection may be performed on these leaf cohorts with the expense report spend transactions added to them respectively to determine if any of the spend transactions of the expense report are outliers and thus should be identified as risky. For example, consider a leaf cohort containing all spend transactions of a parent cohort where the spender city is New York, where the parent cohort contained all spend transactions of the originally formed 202 top-level cohort where the organization level of the spender is not entry level. In this case, if an expense report is submitted by an employee where the expense report contains a spend transaction that would have qualified as a member of the originally formed 202 cohort and where the employee is not an entry level employee but works in New York, then the spend transaction may be considered to be a member of the leaf cohort and outlier detection performed on the leaf cohort with the spend transaction to determine if the spend transaction is risky. Thus, the process 200 facilitates just-in-time/real-time identification of risk transactions such as in response to an employee submitting an expense report or purchase order for approval.

A spend transaction identified as risky by the automatic spend risk identification system may be flagged in a user interface as such by a spend risk flagging system. For example, a user interface used by a user of a software as a service spend management system may contain a visible alert or indication that a particular expense reimbursement request or particular purchase order waiting approval contains one or more spend transactions identified as a risky. The spend risk flagging system may also identifying risk spend transaction as a part of a post-approval audit of already approved expense reimbursement requests and/or purchase orders.

While in some embodiments such as those described above a cohort is divided into two sub-cohorts, a cohort is divided into more than two sub-cohorts in other embodiments. In these embodiments, instead of forming a binary tree hierarchy of cohorts, a N-ary tree of cohorts is formed where N is the number of sub-cohorts at each division. For example, a cohort may be considered for division based on a plurality of categorical attribute values. For example, the plurality of categorical attribute values considered can be all possible values of a given categorical attribute. In this case, there may be one sub-cohort for each possible value plus one additional cohort for all spend transactions of the cohort being considered for division that have none of the possible values. For example, assume the possible values for the categorical attribute city where the spender works include "New York," "Pune," and "San Francisco." In this case, there may be four sub-cohorts, one containing all spend transactions of the parent cohort where the value of this categorical attribute is "New York," one likewise for "Pune," another likewise for "San Francisco," and yet another for all spend transactions of the parent cohort that do not have this attribute or have this attribute with a null or zero value (which may represent an unknown of the city where the spender works). Analogous to the binary tree case, at each division, all remaining categorical attributes may be considered for division of the current spend behavior cohort and the one that minimizes the spend variance, if any, may be selected for division.

Second Embodiment

According to a first embodiment of the divisive analysis techniques for identifying risky spend transactions, cohorts are recursively divided as long as each cohort contains at least a statistically significant number of spend transactions for outlier detection. At each division stage, the cohort with the largest spend diameter may be selected for division. The spend diameter of a cohort may be calculated as the largest spend difference between any two spend transactions in the cohort. The spend distance between two spend transactions may be measured by the Euclidean distance or the Manhattan distance, for example. The cohort selected for division may be divided by identifying the most disparate spend transaction in the cohort. The most disparate spend transaction may be one with the largest average spend distance with the other spend transactions in the cohort. This most disparate spend transaction may initiate a new "breakaway" cohort that contains the most disparate spend transaction. Thereafter, it may be determined if each spend transaction remaining in the "non-breakaway" cohort is closer in average spend distance to the other spend transactions in the non-breakaway cohort or to the spend transactions in the breakaway cohort. The spend transaction in the non-breakaway cohort that is closest to the breakaway cohort may be moved from the non-breakaway cohort to the breakaway cohort. This may be repeated until there are no remaining spend transactions in the non-breakaway cohort that are closer on average to the breakaway cohort than to non-breakaway cohort. After this, the breakaway cohort and the non-breakaway cohort may be added to the hierarchy as children of the current cohort being divided. As mentioned above, the division may then proceed with the breakaway cohort or the non-breakaway cohort depending on which of those cohorts has the largest spend diameter and so long as both cohorts have at least the statistically significant number of spend transactions for outlier detection. As a result of the divisive analysis, a hierarchy of spend behavior cohorts may be produced. Each cohort in the hierarchy may contain spend transactions from the original spend behavior cohort. Outlier detection may be performed on the leaf cohorts in the hierarchy to identify risky spend transactions.

Figure 4:
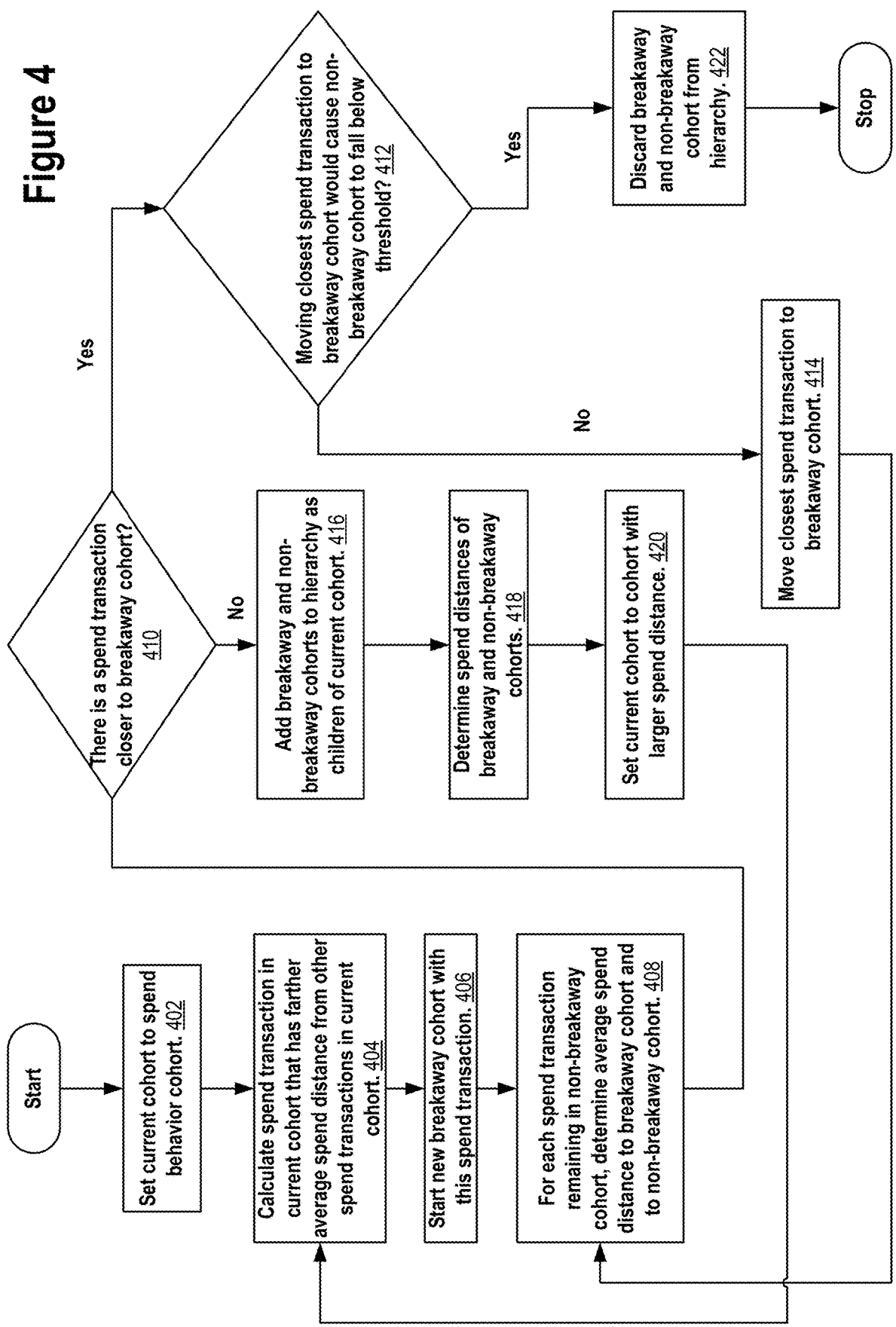
FIG. 4 depicts a process for identifying risky spend transactions based on divisive analysis according to a second embodiment.

FIG. 4 depicts an example process 400 for spend risk identification based on divisive analysis. Before performance of process 400, a spend behavior cohort identification system may identify one or more top-level spend behavior cohorts. Each top-level spend behavior cohort may include one or more spend transactions.

Once the cohort identification system has identified one or more top-level spend behavior cohorts, a divisive analysis system may perform process 400 on a selected top-level spend behavior cohort. For example, the selected top-level spend behavior cohort may represent spend transactions having spend behavior characteristics in common for a particular business, organization, or other entity, or a particular set of businesses (e.g., a set of business all in the same industry.) The spend transactions may span a particular period of time such as for example the past month, past quarter or past year or other period of time.

In general, the process 400 may recursively (or iteratively) divide the selected top-level spend behavior cohort in a top-down manner. The top-down manner may result in transforming the single selected top-level spend behavior cohort into a hierarchy of spend behavior cohorts that has the selected top-level spend behavior cohort at the root of the hierarchy and a plurality of sub-level spend behavior cohorts as direct or indirect descendants of the root within the hierarchy. Each of the sub-level spend behavior cohorts may include a strict subset of the spend transactions in the selected top-level spend behavior cohort. The process 400 may continue the recursive division so long as each of the sub-level spend behavior cohorts contains a statistically significant number of spend transactions suitable for accurate outlier detection.

The process 400 may commence by setting 402 a current cohort variable to refer to the selected top-level spend behavior cohort. The spend transaction in the current cohort that has the farthest average spend distance from the other spend transactions in the current cohort may be calculated 404. A new "breakaway" cohort may be started 406 containing this farthest spend transaction calculated 404 as the initial member of the breakaway cohort. At the same time, an initial non-breakaway cohort may consist of all spend transactions in the selected top-level spend behavior cohort minus the farthest spend transaction moved 406 to the breakaway cohort. For each spend transaction then remaining in the non-breakaway cohort, the average spend distance between the remaining spend transaction and all spend transactions then in the breakaway cohort may be calculated 408. In addition, the average spend distance between the remaining spend transaction and all spend transactions then in the non-breakaway cohort may be calculated 408.

If it is determined 410 that there then is a remaining spend transaction in the non-breakaway cohort that is closer on average to the breakaway cohort than to the non-breakaway cohort and if it is determined 412 that then moving the closest spend transaction from the non-breakaway cohort to the breakaway cohort would not cause the non-breakaway cohort to fall below the statistical threshold for outlier detection, then the spend transaction then determined 410 to be closest on average to the breakaway cohort may be moved 414 from the non-breakaway cohort to the breakaway cohort. The process 400 may then return to start from operation 408 again with the breakaway cohort now having the spend transaction moved 414 to it from the non-breakaway cohort and the non-breakaway cohort now minus the spend transaction moved 414 to the breakaway cohort.

On the other hand, if it is determined 410 that there then is a remaining spend transaction in the non-breakaway cohort that is closer on average to the breakaway cohort than to the non-breakaway cohort and if it is determined 412 that then moving the closest spend transaction from the non-breakaway cohort to the breakaway cohort would cause the number of spend transactions in the non-breakaway cohort to fall below the threshold for outlier detection, then the breakaway cohort and the non-breakaway cohort may be discarded 422 and the process 400 may end with the hierarchy as constructed so far.

Otherwise, if it is determined 410 that there is then no remaining spend transaction in the non-breakaway cohort that is closer on average to the breakaway cohort than to the non-breakaway cohort, then the then breakaway cohort and the then non-breakaway cohort may be added 416 as children to the current cohort in the hierarchy. The spend distances of the then breakaway and non-breakaway cohorts may be calculated 418. The current cohort may be set 420 to the then breakaway or non-breakaway cohort with the largest spend distance calculated 418 between them. The process 400 may then return to proceed from operation 404 with the new current cohort set 420. The process 400 may also end after operation 410 without adding 416 the then breakaway cohort and the then non-breakaway cohort to the hierarchy if the then breakaway cohort does not contain at least the threshold number of spend transactions suitable for accurate outlier detection.

Returning now to the top of process 400, the top-level spend behavior cohort may be represented as a vector. The vector may contain one element per spend transaction in the top-level cohort. Each element may be a number representing a monetary amount associated with the spend transaction. The monetary amount may be standard to a currency (e.g., United States Dollars) according to an exchange rate, if the spend transactions encompass multiple different monetary currencies. For example, the monetary amount be an amount expensed or purchased for a commodity in a particular commodity category, or an average amount expensed or purchased for multiple commodities in the particular commodity category.

A dissimilarity matrix may be calculated from the vector according to a dissimilarity matrix calculation. The dissimilarity matrix calculation may compute all of the pairwise dissimilarities between the elements of the vector. The pairwise dissimilarities may be computed according to a similarity metric such as for example the Euclidean or the Manhattan distance. The Euclidean distance for two monetary amounts may be computed as the root square of the difference between the two monetary amounts. The Manhattan distance for two monetary amounts may be computed as the absolute difference between the two monetary amounts. Monetary amounts in the vector may be standardized before the dissimilarity matrix calculation. For example, each monetary amount in the vector may be standardized by subtracting the mean of all monetary amounts in the vector and dividing by the mean absolute deviation of all monetary amounts in the vector. The divisive analysis system may use the dissimilarity matrix as process 400 proceeds.

At operation 404, the average spend distance for a spend transaction in the then current cohort may be calculated based on a sum of the dissimilarities in the dissimilarity matrix between the spend transaction and each other spend transaction in the then current cohort and based on a number of spend transactions in the then current cohort (e.g., the total number of spend transactions in the current cohort minus one).

As a result of operations 404 and 406, the spend transaction in the then current cohort that is least similar to the other spend transactions in the then current cohort in terms of spend amount starts a new spend behavior cohort representing a different spend behavior than the spend behavior represented by the then current cohort.

At operation 408, the average spend distance for a spend transaction in the then non-breakaway cohort to the then breakaway cohort may be calculated based on a sum of the dissimilarities in the dissimilarity matrix between the spend transaction and each spend transaction then in the breakaway cohort and based on a number of spend transactions then in the breakaway cohort (e.g., the total number of spend transactions then in the breakaway cohort.)

Also at operation 408, the average spend distance for a spend transaction in the then non-breakaway cohort to the then non-breakaway cohort may be calculated based on a sum of the dissimilarities in the dissimilarity matrix between the spend transaction and each other spend transaction then in the non-breakaway cohort and based on a number of spend transactions then in the non-breakaway cohort (e.g., the total number of spend transactions then in the non-breakaway cohort minus one.)

At operation 410, it may be determined that a spend transaction in the then non-breakaway cohort is closer to the then breakaway cohort than to the then non-breakaway cohort by subtracting (a) the average spend distance for the spend transaction to the then non-breakaway cohort determined at operation 408 from (b) the average spend distance for the spend transaction to the then breakaway cohort. If the result of the subtraction is positive, then it may be determined that the spend transaction is closer to the then breakaway cohort than to the then non-breakaway cohort. If the result of the subtraction is zero or negative, then it may be determined that the spend transaction is closer to the then non-breakaway cohort than to the breakaway cohort. The spend transaction in the then non-breakaway cohort with the most positive result of this subtraction may be considered to be the closest spend transaction in the then non-breakaway cohort to the then breakaway cohort. If there is no spend transaction in the then non-breakaway cohort with a positive result of this subtraction, then it may be determined at operation 410 that there is no spend transaction in the then non-breakaway cohort that is closer to the then breakaway cohort than to the then non-breakaway cohort.

As a result of operations 408 and 410 in conjunction with operation 414, the spend transactions in the then current cohort are divided between the breakaway cohort and the non-breakaway cohort depending on whether the spend behavior of the spend transaction in terms of amount spent is closer on average to the spend behavior of the breakaway cohort or closer on average to the spend behavior of the non-breakaway cohort.

At operation 418, the cohort of the then breakaway cohort and the then non-breakaway cohort with the largest spend distance may be determined by comparing the largest dissimilarity in the dissimilarity matrix between two spend transactions in the then breakaway cohort with the largest dissimilarity in the dissimilarity matrix between two spend transactions in the then non-breakaway cohort. As a result of operation 418, the cohort with the largest spend behavior variance in terms of amount spent is subject to the next division.

As discussed herein, the process 400, including the individual operations thereof, may run in single or multiple instances, and run in parallel, in conjunction, together, or one process 400 or individual operation may be a sub-process or sub-operation of another process 400 or individual operation. Further, any of the processes discussed herein, including process 400 may run on the systems and hardware discussed herein, including those depicted in FIG. 1 and FIG. 5.

After the divisive analysis system has applied process 400 to a selected top-level spend behavior cohort, an automatic spend risk identification system may conduct outlier analysis on the leaf cohorts of the hierarchy produced as a result of the divisive analysis. Here, a leaf cohort is a sub-level spend behavior cohort of the hierarchy produced that does not have any descendant sub-level spend behavior cohorts in the hierarchy. The outlier analysis may be conducted in various ways according to outlier detection criteria.

According to example one outlier detection criteria, a spend transaction is considered to be risky if the spend amount of the spend transaction is greater than three deviations from the mean of all spend transactions in the leaf cohort.

According to another example outlier detection criteria, a spend transaction is considered to be risky if the spend amount of the spend transaction is above the third quartile of all spend amounts of all spend transactions in the leaf cohort plus 1.5 times (inner) or 3 times (outer) the interquartile range of all spend amounts of all spend transactions in the leaf cohort (i.e., above the upper inner or upper outer Tukey fence.) Other outlier detection criteria may be used including combinations (e.g., weighted) of different outlier detection criteria according to the requirements of the particular implementation at hand.

A spend transaction identified as risky by the automatic spend risk identification system may be flagged in a user interface as such by a spend risk flagging system. For example, a user interface used by a user of a software as a service spend management system may contain a visible alert or indication that a particular expense reimbursement request or particular purchase order waiting approval contains one or more spend transactions identified as a risky. The spend risk flagging system may also identifying risk spend transaction as a part of a post-approval audit of already approved expense reimbursement requests and/or purchase orders.

Example Computing Environment

Figure 5:
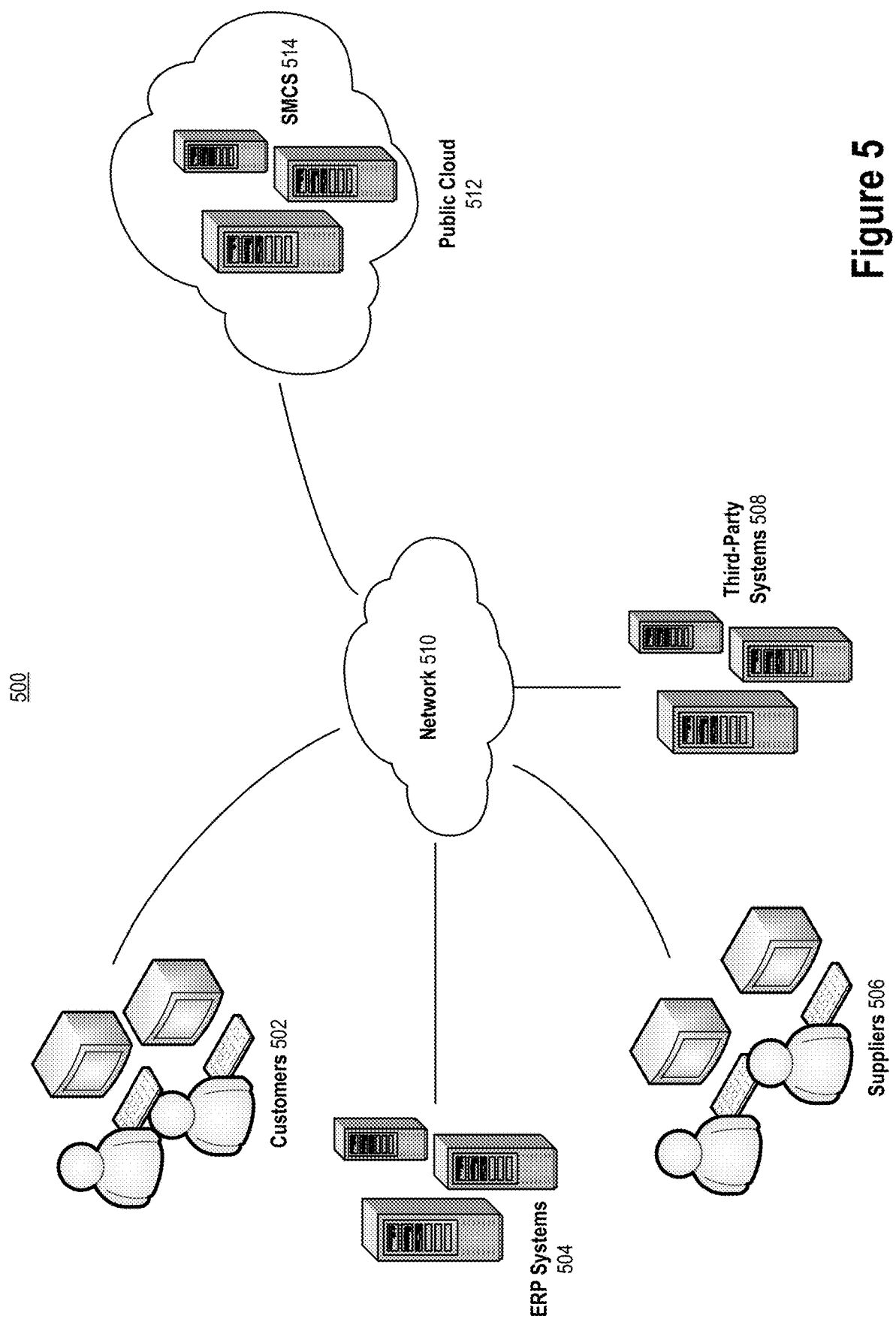
FIG. 5 depicts an example system for identifying risky spend transactions based on divisive analysis, according to some embodiments.

FIG. 5 is a schematic diagram of a software as a service computing environment 500 in which process 200 and/or process 400 may be performed.

Environment 500 includes customers 502 with their respective personal computer systems, enterprise resource planning (ERP) computer systems 504, suppliers 506 and their respective personal computer systems, third-party computer systems 508, data communications network 510 (e.g., the public internet), and public cloud 512 hosting spend management cloud service (SMCS) 514.

The spend cohort identification computing system, the divisive analysis computing system, the automatic spend risk identification computing system and the spend risk flagging computing system discussed above as performing various operations with respect to process 200 may be parts of or components of SMCS 514.

In addition, or alternatively, the spend cohort identification computing system, the divisive analysis computing system, the automatic spend risk identification computing system and the spend risk flagging computing system discussed above as performing various operations with respect to process 400 may be parts of or components of SMCS 514.

Generally, SMCS 514 provides business spend management services to customers 502 of suppliers 504. Such services may include collecting, cleansing, classifying and analyzing spend data for the purpose of decreasing procurement costs, improving efficiency and monitoring compliance. Other purposes of using SMCS 514 may include inventory management, budgeting and planning and product development.

Each customer 502 may be a business, organization, corporation, school, governmental agency, or other entity. Each customer 502 may have one or more user accounts with which users (e.g., employees) of the customer 502 can authenticate and access SMCS 514 over network 510.

At a high-level, customers 502 may use SMCS 514 for analysis of their spend data and for other spend management functions such as submitting and approving expense reports and purchase orders. Customers 502 may include buyers, sourcing managers, sourcing administrators, supplier managers or other spend or procurement administrators of businesses. Spend data may encompass requisitions (both submitted and approved), invoices, and purchase orders. A goal of conducting spend analysis using SMCS 514 may be to answer crucial questions affecting business spend, including: What is business purchasing? Who is the business purchasing from? Is the business getting what has been promised for that send?

Customers 502 may use SMCS 514 to conduct other spend management activities, including for example commodity management and strategic sourcing. By using SMCS 514 to conduct spend management activities, customers 502 can improve their business profitability, improve regularity compliance, reduce cycle times, discover new areas of savings through supplier consolidation and supplier diversification, and retain past areas of savings that they have already negotiated.

Customers 502 use their personal computers to interact with SMCS 514 over network 510 according to one or more online interaction protocols. The personal computers can include desktop computers, laptop computers, tablet computers, mobile phones, or like personal computing devices. The online interaction protocol(s) may be supported by both a client application that executes at the personal computers of the customers 502 and a server application that executes at one or more server computers that host the SMCS 514. For example, the client application and the server application may exchange data over network 510 using the HTTP/S networking protocol. The data exchanged may be formatted in a variety of different ways including for example as HTML, CSS, Javascript, XML, JSON, etc. The client application may be an industry-standard web browser application or a mobile application, for example. SMCS 514 may cause particular graphical user interfaces (e.g., web pages with particular content) to be displayed by the client applications at the personal computers of the customers 502 by using the online interaction protocol(s) and network 510 to send information to the personal computers of the customers 502 for processing by the client applications.

Customers 502 may interact with SMCS 514 by directing user input (e.g., keyboard, pointing device or touch input) to the graphical user interfaces, thereby causing the client applications to use the online interaction protocol(s) to send information over network 510 to SMCS 514 for processing by SMCS 514. Suppliers 504 may likewise use their personal computers to interact with SMCS 514 over network 510 according to the online interaction protocol.

SMCS 514 may be hosted in public cloud 512. Public cloud 512 may include computing services offered by third-party providers over the public internet (e.g., network 510), making them available to anyone who wants to use or purchase them. The computing services may be sold on-demand, allowing the SMCS 514 provider to pay only per usage for the CPU cycles, storage or bandwidth consumed. Even though the provider of SMCS 514 may not also provide the public cloud 512 computing services, the SMCS 514 provider may still be responsible for management and maintenance of the SMCS 514 within the public cloud 512, including putting the SMCS 514 in service on network 510.

Customers 502 may integrate ERP systems 504 and third-party systems 508 with SMCS 514 via network 510. The purpose of the integration may be to import spend data into and export send data from SMCS 514. Spend data imported into SMCS 514 from ERP systems 504 and third-party systems 508 may be processed by applications of the SMCS 514 including an application that implements techniques disclosed herein for identifying risk spend transactions based on divisive analysis.

The integration over network 510 may be accomplished using one or more spend data integration protocols. One possible integration protocol is using flat files uploaded to and downloaded from a secure file transfer protocol (SFTP) server operated by the SMCS 514 provider. The flat files may be CSV files, for example, that contain spend data. Another possible integration protocol for importing/exporting spend data is using a REST API offered by servers of the SMCS 514. For example, the flat file integration protocol may be used for bulk import and export of spend data, and the REST API integration protocol may be used for real-time import and export of spend data.

The general types of data imported into SMCS 514 from ERP systems 504 and third-party systems 508 may include master data and transactional data (also referred to as spend data herein.) Master data may include general ledger account codes, supplier information, exchange rate information, budget line information, and user information. Transactional data (i.e., spend data) may include requisitions, purchase orders, invoices, approved invoices, receipts, purchase order revisions, invoice voids, credit memos, invoice payments and expenses.

Some types of information may be only imported from ERP systems 504 and third-party systems 508 into SMCS 514 (e.g., general ledger account codes, user information, payments), some types of information only exported from SMCS 514 to ERP systems 504 and third-party systems 508 (e.g., purchase orders and receipts), and some types of information both imported and exported between SMCS 514 and ERP systems 504 and third-party systems 508 (e.g., supplier information and invoices.)

Transactional data may be imported and exported more frequently than master data. For example, transaction data may be import or exported between SMCS and an ERP system 504 or a third-party system 508 on an hourly basis while master data may be imported or exported between those systems on a daily basis.

ERP systems 504 may include ERP software as a service system (e.g., NetSuite™) and more traditional ERP systems (e.g., SAP™, Oracle™, Great Plains™, etc.). Third-party systems 506 may include non-ERP systems that provide or use spend data including for example, accounts payable systems (e.g., Scan One™) invoicing systems, corporate credit card systems, and data warehouse systems.

Example Graphic User Interface

Figure 6:
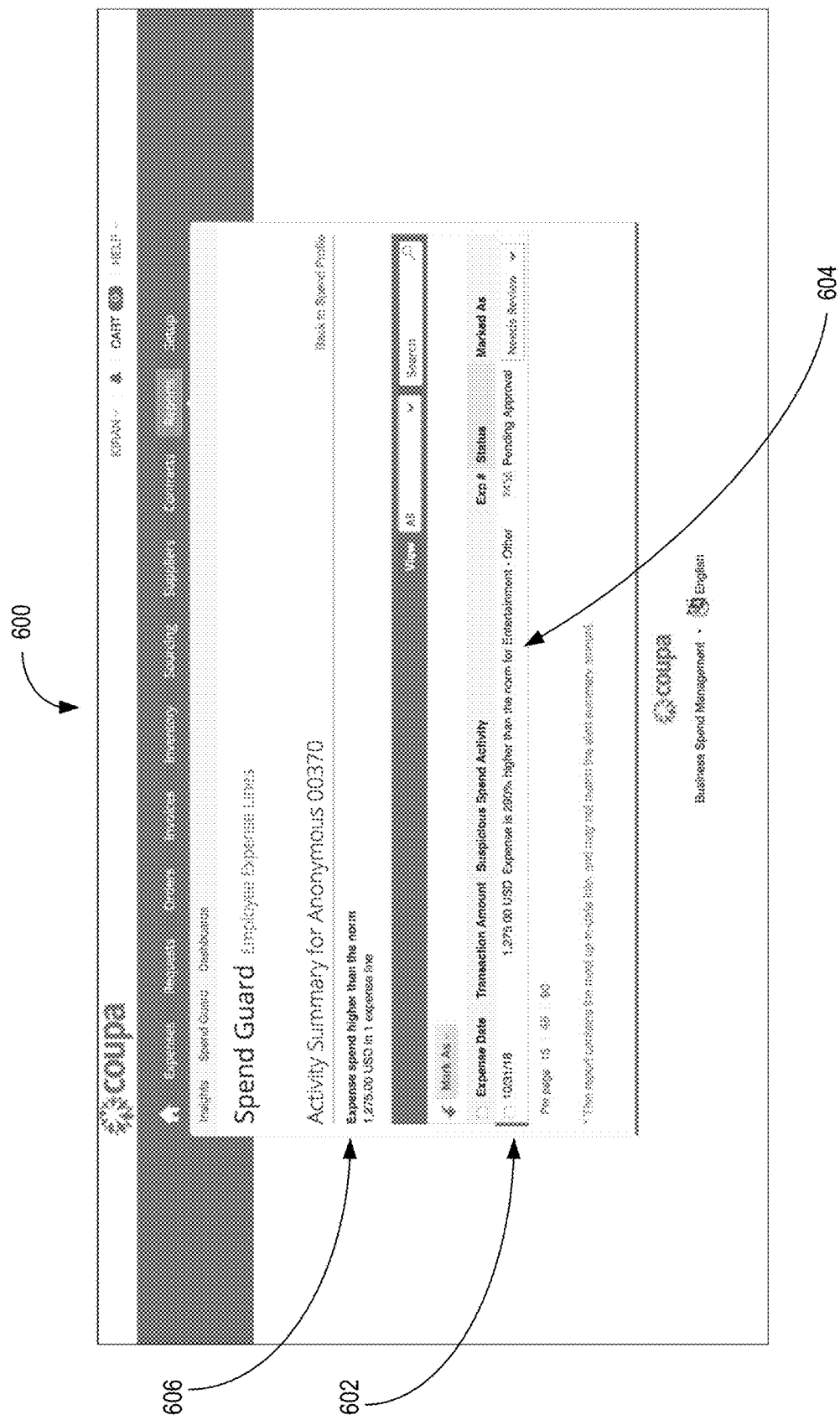
FIG. 6 is a screenshot of a graphical user interface for indicating that a spend transaction is identified as risky according to the first or the second embodiment.

FIG. 6 is a screenshot example of causing, using a spend risk flagging system, display of an indication in user interface 600 that a particular spend transaction is risky in accordance with the first or the second embodiment for identifying risky spend transactions. In user interface 600, text indications 604 and 606 are provided that a particular spend transaction is risky. In particular, user interface 600 includes a row 602 of a table that lists risky spend transactions. In this example, there is only one row in the table, but it is possible for such a table to list multiple spend transactions that are deemed risky in accordance with the first or the second embodiment for identifying risky spend transactions. Row 602 is for a particular expense spend transaction and includes information about the expense spend transaction in various columns of row 602 such as the date of the expense, the transaction amount, textual characterization 604 of why the expense is deemed risky, the expense report number, the approval status of the expense, etc. In row 602 of the table, text indication 604 is provided that characterizes why the expense transaction is deemed risky. In particular, according to text indication 604, the expense transaction is "290% higher than the norm" for the expense category/type of "Entertainment—Other." Text indication 606 is also provided that indicates that all expense transactions listed in the table have an "[e]xpense spend higher than the norm."

While in an implementation a textual indication is provided in a graphical user interface to indicate that a particular spend transaction is deemed risky, other types of indications may be provided in a computer graphical user interface in addition to or instead of textual indications in another implementations. For example, one or more of graphics, icons, GUI element colorings, GUI element highlighting, or other visual indication may be provided.

While in an implementation an indication that a spend transaction is deemed risky is provided in a web-based graphical user interface such as the example web-based graphical user interface of FIG. 6 (e.g., on a web page rendered and displayed by a web browser application or a mobile application), an indication that a spend transaction is deemed risky is provided as text and/or multimedia in an electronic communications message that is received and displayed in a user interface at an end-user's personal computing device. The electronic communications message can be, for example, in a short message service (SMS) message, a Multimedia Messaging Service (MMS) message, or an electronic mail (e-mail) message that is received and displayed in a user interface at an end-user's personal computing device Hardware Overview FIG. 1 is a block diagram that illustrates example computer system 100 that may be used in an implementation of the computer-implemented techniques disclosed herein for identifying risk spend transactions based on divisive analysis.

Computer system 100 includes a bus 102 or other communication mechanism for communicating information, and a hardware processor 104 coupled with bus 102 for processing information.

Hardware processor 104 may be, for example, a general-purpose microprocessor, a central processing unit (CPU) or a core thereof, a graphics processing unit (GPU), or a system on a chip (SoC). Computer system 100 may include one or more hardware processors 104 coupled with bus 102. Thus, reference in the following to a single processor 104 is intended to encompass multi-processor 104 computer systems 100.

Computer system 100 also includes a main memory 106, typically implemented by one or more volatile memory devices, coupled to bus 102 for storing information and instructions to be executed by processor 104. Main memory 106 also may be used for storing temporary variables or other intermediate information during execution of instructions by processor 104.

Computer system 100 may also include a read-only memory (ROM) 108 or other static storage device coupled to bus 102 for storing static information and instructions for processor 104. A storage system 110, typically implemented by one or more non-volatile memory devices, is provided and coupled to bus 102 for storing information and instructions.

Computer system 100 may be coupled via bus 102 to a display 112, such as a liquid crystal display (LCD), a light emitting diode (LED) display, or a cathode ray tube (CRT), for displaying information to a computer user. Display 112 may be combined with a touch sensitive surface to form a touch screen display. The touch sensitive surface is an input device for communicating information including direction information and command selections to processor 104 and for controlling cursor movement on display 112 via touch input directed to the touch sensitive surface such by tactile or haptic contact with the touch sensitive surface by a user's finger, fingers, or hand or by a hand-held stylus or pen. The touch sensitive surface may be implemented using a variety of different touch detection and location technologies including, for example, resistive, capacitive, surface acoustical wave (SAW) or infrared technology.

An input device 114, including alphanumeric and other keys, may be coupled to bus 102 for communicating information and command selections to processor 104.

Another type of user input device may be cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

Instructions, when stored in non-transitory storage media accessible to processor 104, such as, for example, main memory 106 or storage system 110, render computer system 100 into a special-purpose machine that is customized to perform the operations specified in the instructions. Alternatively, customized hard-wired logic, one or more ASICs or FPGAs, firmware and/or hardware logic which in combination with the computer system causes or programs computer system 100 to be a special-purpose machine.

A computer-implemented process may be performed by computer system 100 in response to processor 104 executing one or more sequences of one or more instructions contained in main memory 106. Such instructions may be read into main memory 106 from another storage medium, such as storage system 110. Execution of the sequences of instructions contained in main memory 106 causes processor 104 to perform the process. Alternatively, hard-wired circuitry may be used in place of or in combination with software instructions to perform the process.

The term "storage media" as used herein refers to any non-transitory media that store data and/or instructions that cause a machine to operate in a specific fashion. Such storage media may comprise non-volatile media (e.g., storage system 110) and/or volatile media (e.g., main memory 106). Non-volatile media includes, for example, read-only memory (e.g., EEPROM), flash memory (e.g., solid-state drives), magnetic storage devices (e.g., hard disk drives), and optical discs (e.g., CD-ROM). Volatile media includes, for example, random-access memory devices, dynamic random-access memory devices (e.g., DRAM) and static random-access memory devices (e.g., SRAM).

Storage media is distinct from but may be used in conjunction with transmission media. Transmission media participates in transferring information between storage media. For example, transmission media includes coaxial cables, copper wire and fiber optics, including the circuitry that comprise bus 102. Transmission media can also take the form of acoustic or light waves, such as those generated during radio-wave and infra-red data communications.

Computer system 100 also includes a network interface 118 coupled to bus 102. Network interface 118 provides a two-way data communication coupling to a wired or wireless network link 120 that is connected to a local, cellular or mobile network 122. For example, communication interface 118 may be IEEE 802.3 wired "ethernet" card, an IEEE 802.11 wireless local area network (WLAN) card, an IEEE 802.15 wireless personal area network (e.g., Bluetooth) card or a cellular network (e.g., GSM, LTE, etc.) card to provide a data communication connection to a compatible wired or wireless network. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through network 122 to a local computer system 124 that is also connected to network 122 or to data communication equipment operated by a network access provider 126 such as, for example, an internet service provider or a cellular network provider. Network access provider 126 in turn provides data communication connectivity to another data communications network 128 (e.g., the internet). Networks 122 and 128 both use electrical, electromagnetic or optical signals that carry digital data streams. The signals through the various networks and the signals on network link 120 and through communication interface 118, which carry the digital data to and from computer system 100, are example forms of transmission media.

Computer system 100 can send messages and receive data, including program code, through the networks 122 and 128, network link 120 and communication interface 118. In the internet example, a remote computer system 130 might transmit a requested code for an application program through network 128, network 122 and communication interface 118. The received code may be executed by processor 104 as it is received, and/or stored in storage device 110, or other non-volatile storage for later execution.

Extensions and Alternatives

While techniques disclosed herein for identifying risky spend transactions based on divisive analysis have been described in some detail with specific reference to example embodiments and certain alternatives, there is no intent to limit the techniques to those particular embodiments or those specific alternatives. For example, those skilled in the art will appreciate that modifications may be made to the described embodiments without departing from the techniques of the present disclosure. For example, the divisive analysis described above may be performed on spend transactions aggregated from expense reports and purchase orders instead of on individual spend transactions from expense reports and purchase orders. For example, spend transactions over a period of time (e.g., during a month, quarter or year) may be aggregated (summed) on a per-employee basis to identify, in the aggregate, a particular employee that engages in risky spend behavior compared to the aggregated spend of other employees.

Further, while techniques are described herein as involving recursive division of cohorts in a top-down manner, one skilled in the art will recognize that a recursive algorithm disclosed herein can be implemented as an iterative algorithm and vice versa. Thus, reference herein to recursion or recursively dividing is not intended to limit the associated implementation to only a recursive implementation and an equivalent iterative implementation may be substituted for a recursive implementation according to the requirements of the particular implementation at hand.

Processes (e.g., process 200 and 400) are described herein with respect to flow diagram figures (e.g., FIG. 2 and FIG. 4) that show certain steps having an apparent order of performance. However, one skilled in the art will recognize that certain steps may be performed in a different order than is shown in the drawings, including some steps potentially being performed concurrently. Thus, performance of the steps of the processes described herein and depicted in the drawings are not necessarily limited to being performed in the order described and shown.

The invention claimed is:

1. A computer system, comprising:
a plurality of personal computer systems of customers and suppliers that are communicatively coupled to a data communication network;
one or more enterprise resource planning (ERP) computer systems that are communicatively coupled to the data communication network;
one or more third-party systems that are communicatively coupled to the data communication network;
a spend management cloud service (SMCS) that is communicatively coupled to the data communication network and comprising one or more processors and one or more non-transitory computer-readable storage media coupled to the one or more processors and storing one or more sequences of instructions which, when executed using the one or more processors, cause the one or more processors to perform:
uploading a plurality of CSV files of spend data from the one or more of the ERP systems and the one or more third party systems to the SMCS via a secure file transfer protocol server, the plurality of CSV files comprising one or more of master data and transactional data;
causing web pages with particular content to be displayed by client applications at the plurality of personal computer systems of the customers and suppliers using an online interaction protocol;
identifying, using a spend behavior cohort identification system, top-level spend behavior cohorts of spend transactions based on one or more spend behavior characteristics of spend transactions, wherein the spend behavior cohort identification system executes using one or more computer systems;
recursively or iteratively dividing, using a divisive analysis system, a selected top-level spend behavior cohort resulting in a plurality of sub-level spend behavior cohorts arranged in a hierarchy, wherein one of the plurality of sub-level spend behavior cohorts comprises all spend transactions of the selected top-level spend behavior cohort having a selected categorical attribute value and does not comprise any spend transactions not having the selected categorical attribute value, and another of the plurality of sub-level spend behavior cohorts comprises all spend transactions of the top-level spend behavior cohort not having the selected categorical attribute value and does not comprise any spend transactions of the spend behavior cohort having the selected categorical attribute value, and comprising dividing the selected top-level spend behavior cohort according to a set of categorical attributes by determining the corresponding selected categorical attribute value that minimizes spend variance of spend transactions or maximizes spend amount homogeneity of the plurality of sub-level spend behavior cohorts with respect to the selected top-level spend behavior cohort;
identifying, using an automatic spend risk identification system, a leaf spend behavior cohort of the plurality of sub-level spend behavior cohorts, arranged in the hierarchy, in response to determining the minimized spend variance of the spend transactions or the maximized spend amount homogeneity of the plurality of sub-level spend behavior cohorts with respect to the selected top-level spend behavior cohort;

detecting, using the automatic spend risk identification system, a particular spend transaction that is a statistical outlier among spend transactions of the leaf spend behavior cohort of the plurality of sub-level spend behavior cohorts arranged in the hierarchy, wherein the automatic spend risk identification system executes using one or more computer systems; and causing a particular web page to be displayed by client applications at the personal computers of a particular customer using the online interaction protocol, the particular web page comprising a graphical table of risky spend transactions comprising at least one row identifying the particular expense spend transaction and comprising at least a textual characterization of why the particular spend transaction is risky.

2. The computer system of claim 1, further comprising sequences of instructions which when executed using the one or more processors cause the one or more processors to execute: causing the particular web page to include one or more of graphics, icons, graphical user interface (GUI) element colorings, or GUI element highlighting with the textual characterization.

3. The computer system of claim 1, further comprising sequences of instructions which when executed using the one or more processors cause the one or more processors to execute: causing transmitting an indication that the particular expense spend transaction is risky via an electronic communications message that is received and displayed in the graphical user interface at one of the plurality of personal computer systems.

4. The computer system of claim 3, the electronic communications message comprising one or a short message service (SMS) message, a Multimedia Messaging Service (MMS) message, or an electronic mail (e-mail) message.

5. The computer system of claim 1, further comprising sequences of instructions which when executed using the one or more processors cause the one or more processors to execute: at each division of a spend behavior cohort of the plurality of sub-level spend behavior cohorts in the hierarchy, based on remaining categorical attribute value corresponding to the predefined set of categorical attributes:

one of the plurality of sub-level spend behavior cohorts comprising all spend transactions of the spend behavior cohort having the selected categorical attribute value and not comprising any spend transactions not having the selected categorical attribute value, and another of the plurality of sub-level spend behavior cohorts comprising all spend transactions of the spend behavior cohort not having the selected categorical attribute value and not comprising any spend transactions of the spend behavior cohort having the selected categorical attribute value, wherein spend variance of the spend transactions for each of the one of the plurality of sub-level spend behavior cohorts and the another of the plurality of sub-level spend behavior cohorts is evaluated according to the selected categorical attribute value and remaining categorical attribute value respectively.

6. The computer system of claim 1, further comprising sequences of instructions which when executed using the one or more processors cause the one or more processors to execute: identifying, using the spend behavior cohort identification system, the top-level spend behavior cohorts of spend transactions based on spend transactions all having a same spend transaction type.

7. The computer system of claim 1, the same spend transaction type being one of an expense report or a purchase order.

8. The computer system of claim 1, further comprising sequences of instructions which when executed using the one or more processors cause the one or more processors to execute: detecting, using the automatic spend risk identification system, the particular spend transaction that is the statistical outlier among spend transactions of the leaf spend behavior cohort based on determining that a spend amount of the particular spend transaction is greater than three deviations from a mean spend amount of the leaf spend behavior cohort.

9. The computer system of claim 1, further comprising sequences of instructions which when executed using the one or more processors cause the one or more processors to execute: detecting, using the automatic spend risk identification system, the particular spend transaction that is the statistical outlier among spend transactions of the leaf spend behavior cohort based on determining that a spend amount of the particular spend transaction is above an upper inner Tukey fence spend amount of the spend behavior cohort.

* * * * *